May 31, 1966 L. J. MOWRY ETAL 3,254,196

END WELDABLE STUD FLUXING

Filed May 24, 1961

INVENTOR.
Lorenz J. Mowry
BY Robert W. Murdock
Watts Edgerton Pyle + Fisher
ATTORNEYS

United States Patent Office 3,254,196
Patented May 31, 1966

3,254,196
END WELDABLE STUD FLUXING
Lorenz J. Mowry, Elyria, and Robert W. Murdock, Vermilion, Ohio, assignors to Gregory Industries, Inc.
Filed May 24, 1961, Ser. No. 112,420
3 Claims. (Cl. 219—99)

This invention relates to welding fluxes and more particularly to welding fluxes for drawn arc welding of studs.

End welded studs welded by the drawn arc welding method usually are under one inch in diameter for most purposes. There have not been a great number of instances where larger size studs have been needed.

In the welding of these studs, a flux material is usually used on the end of the stud in order to consume the atmospheric oxygen and otherwise assist in the production of a good and sound weld. There have been many theories about arc propagation and the uniform melting of the stud end and workpiece where the stud is to be seated. The length of time that the arc is in existence is so short that it has been impractical to even attempt accurate determination of what does take place in the melting of the stud end. It is known from results obtained that certain influences will cause the stud to burn off irregularly, the weld to take place entirely to one side, or otherwise produce an irregular or unsatisfactory weld. The weld should be uniform across the entire end and should produce a uniform weld metal fillet around the stud.

Various fluxing methods have been employed and these methods include the use of a piece of solid material such as aluminum, a coating of flux metal deposited by spraying, and a granular type of flux held on the end of a stud by a cap.

Each one of these methods of fluxing has proven to be satisfactory for various particular applications, and each has had shortcomings in particular applications. Not too much provable knowledge is available with respect to what takes place during a weld and what the real needs are under all circumstances. In the smaller size studs it has been possible to ignore the problem to some extent, because the amount of flux material that could normally be placed on the end of the stud produced a good weld in almost all instances. Wide variations have been tolerated.

However, there has been an interest in larger size studs for particular purposes, and in sizes of about one inch or more in diameter it has been found that a mere increase in the amount of fluxing material along conventional patterns of increase with size, fails to produce good welds. In other words, it appears that prior methods simply were workable because of size and a genuine knowledge of need was not necessary.

It has now been discovered, in determining how to make a reliable weld of larger size studs, that the quantity and rate of consumption of fluxing material must be controlled and related to the arc development to assure good welds in larger sizes. A side benefit of the discovery of the present invention is the fact that even better weld and fluxing results are obtained in the smaller sizes by using the principles of this present invention.

Large studs require much more heat energy than small studs, and whenever the same flux methods are applied to large studs that produced satisfactory welds in small studs, failures often appear. The failures appear often to be of the type caused by lack of proper flux. If enough flux is used according to theoretical calculations, but failures appear that indicate a lack of flux, it is manifest that the flux is being dissipated before the proper time. On the other hand, the use of excess flux often results in retention of metallic flux metal in the weld, and faulty welds result. It has also been found that excess flux actually promotes arc wander.

Because of the fact that such studs are widely used in circumstances where failure will result in high property damage, and often in danger to human safety, failures are not tolerable.

This invention is the result of recognition of the factors outlined, and provides a fluxing structure which relates the rate of flux consumption to the rate of stud melting. Thus, whenever combined with a stud end geometry which will cause a uniform arc development, the ultimate in end weld studs of all sizes is obtained.

Therefore, one of the principal objects of this invention is to provide a flux for end welding steel studs which produces excellent welds over a wide range of sizes of studs.

A more particular object of this invention is to provide a flux having a composition and physical characteristics which permit use on steel studs for end welding to produce excellent welds over a wide range of studs.

Another object of this invention is to provide a flux and related stud end geometry structure which causes the flux to be consumed uniformly.

Another specialized object of this invention is to provide a welding stud having an optimum arc stabilizing welding end with a flux of optimum physical characteristics contoured to the shape of the welding end of the stud.

Other objects and a fuller understanding of the invention may be had by referring to the following description and claims taken in conjunction with the accompanying drawing, in which:

Figure 1:
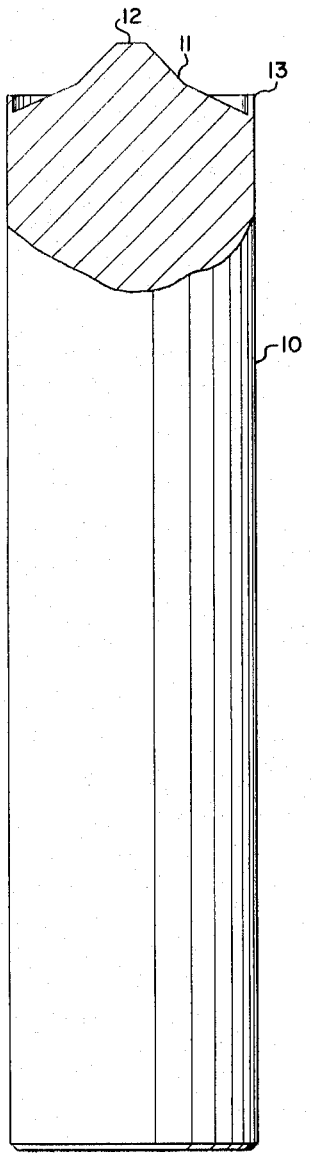
FIGURE 1 is an elevational view of a steel stud suitable for end welding having its end formed to receive the flux.

Referring now to the drawing and particularly to FIGURE 1, a cylindrical steel stud designated generally as 10 is provided having a welding end 11. The welding end 11 tapers to a blunted point 12 which lies on the axis of the stud. An annular flange 13 is formed at the outer periphery of the welding end 11. The end geometry of Patent No. 2,878,363 is also used for many studs.

Figure 2:
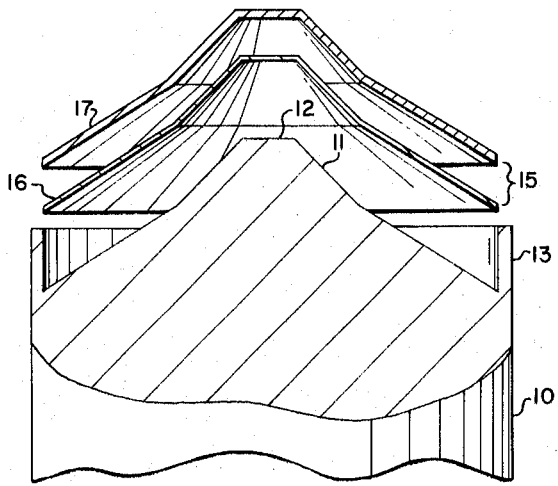
FIGURE 2 is a greatly enlarged sectional view of the welding end of a steel stud having the flux ready for placement; and, FIGURE 3 is a greatly enlarged sectional view of the welding end of a steel stud showing the flux in place.
Figure 3:
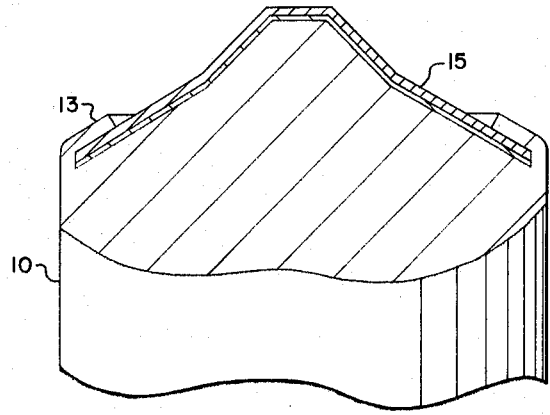

Referring now to FIGURE 2, a composite flux is shown ready to be placed on the welding end 11. The composite flux illustrated in FIGURE 2 is the preferred embodiment for most known end welding conditions and is composed of a sheet of aluminum foil 16 and a sheet of steel 17 forms a cap. The aluminum foil 16 is contoured to fit the welding end 11, and the steel sheet 17 is contoured to fit over the aluminum foil 16. United, as shown in FIGURE 3, the composite flux is referred to as flux 15. The illustrated foil 16 is referred to as aluminum because this is the most conventional oxygen scavenging material now in use. Foil 16 is shown of uniform gauge although it has been found that some instances will produce better results with a non-uniform thickness in order to provide more fluxing at a particular stage of arc development. In some instances it has been found that an annular ring of aluminum around the outer edge only of the cap will serve better than a full sheet. Furthermore, the illustrations and this description hereafter will set forth a single sheet of aluminum and a single sheet of steel, but multiple layers of flux material and cap material are within the concept of this invention.

Referring now to FIGURE 3, the flux 15 is shown in place on the welding end 11. One face of the aluminum foil 16 is in intimate metal-to-metal contact with the welding end 11. The other face of the aluminum foil 16 is in intimate metal-to-metal contact with one face of the steel sheet 17. The other face of the steel sheet presents an outwardly directed arc striking face culminating in a blunted point of the same general configuration as the point 12. The annular flange 13 is crimped over the outwardly directed face of the steel sheet to retain the flux 15 in place. As thus assembled and constituted, the flux could be termed a bimetal flux. The aluminum foil and steel strip may be applied separately or preformed as a bimetal, thus comprising a unitary flux structure. An efficient and useful procedure is to roll bond the aluminum and steel, and thereafter form them as a composite cap. Also, the aluminum may be applied to the stud by spraying, and then covered by a tight steel cap.

It is important that the shape of the steel cap and the shape of the aluminum sheet conform to the shape of the stud end and that the composite flux be tight against the stud end. It appears that by making the aluminum sheet tight against the mass of the stud by means of the steel cap, the rate of heat transfer prevents premature flux burning and prolongs the flux life. Further, the thick cap of steel aids in slowing the burn rate of the aluminum because the stud melts uniformly and only as the arc spreads and protects the aluminum until the steel is burned away.

In comparative tests, it has been found that a flux made of aluminum and steel as described gives outstanding welds in studs of large size. For example, in tests conducted with 1¼ inch studs, it was found that excellent results were obtained by using aluminum foil of about .008 inch thickness and a steel cap of at least .018 inch thickness. In this size with prior fluxing procedures, good results were not always predictable. The entire explanation of why this aluminum foil-steel sheet flux produces such excellent results is not completely understood. However, it is believed that one of the major reasons for such performance lies in the fact that during the welding operation, while the pool of molten metal is being formed, the aluminum is being continuously made available simultaneous with the pool formation. It is to be noted, particularly with respect to the prior art slug load, that the aluminum has a propensity to melt and "burn off" prior to or very early in the pool formation, and thus limit the available oxygen scavenging material during this critical part of the welding operation.

According to this invention, a steel cap is placed over the aluminum foil flux to: (1) protect the thin aluminum flux from physical damage and contamination due to handling, (2) hold the soft foil, when foil is used, firmly against the base of the bore, (3) protect the flux from damage and loss when the bore wall is crimped, and (4) provide a quantity of molten steel with which the aluminum may alloy before it is exposed to any oxidizing atmosphere around the arc.

In addition to the above and in accordance with our theory of the invention the conical confining steel sheath for the sheet aluminum produces a continuous, controlled progressive fluxing action in the molten pool of weld metal. That is, for every unit of steel melted off the stud, a given amount of aluminum flux is fed into the pool, and this process takes place throughout the entire melting period. It is believed, according to this invention, that this continuous, controlled progressive fluxing action is essential to good arc stability and arc propagation. Furthermore, this method of providing the aluminum flux to the molten pool overcomes the disadvantages of prior fluxing methods wherein the aluminum is frequently completely consumed or lost during the early part of the arcing period, leaving nothing for the latter part of the cycle. Such prior early consumption of flux becomes progressively worse as the diameter of the stud increases and thus as the arcing time increases. Therefore, this invention is particularly desirable in the larger size studs wherein the arcing time is considerably greater as the arc spreads from the central portion of the stud to the outer diameter.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A steel welding stud suitable for end welding and having a welding end, said welding end having a pointed end geometry, a sheet of aluminum foil of substantially uniform thickness substantially completely covering the welding end and in intimate contact therewith, a ferrous metal cap of substantially uniform thickness substantially completely covering said aluminum foil and in intimate contact therewith, and means to maintain said foil and said ferrous metal cap as positioned.

2. A welding stud suitable for end welding comprising a welding end of generally conical shape and a sheet of weld flux material, of substantially the same shape as the welding end of said stud, held tightly against the stud by a steel cap.

3. A welding stud suitable for end welding comprising a welding end of generally conical shape and a thin strip of aluminum of substantially the same shape as the welding end of said stud, held tightly against the stud by a steel cap.

References Cited by the Examiner

UNITED STATES PATENTS

| 2,402,659 | 6/1946 | Nelson | 287—20.2 |
| 2,441,257 | 5/1948 | Candy | 219—99 |
| 2,506,747 | 5/1950 | Smith | 219—99 |
| 2,760,797 | 8/1952 | Woodling | 287—20.2 |
| 2,858,414 | 10/1958 | Dash | 219—99 |
| 2,993,982 | 7/1961 | Glover | 219—99 |
| 3,037,109 | 5/1962 | Glover | 219—99 |

FOREIGN PATENTS 43,187   4/1954   Italy.

ANTHONY BARTIS, *Acting Primary Examiner.*
RICHARD M. WOOD, *Examiner.*